United States Patent Office 3,429,947
Patented Feb. 25, 1969

3,429,947
THERMO-SETTING RESINOUS COMPOSITIONS CONSISTING OF A COPOLYMER OF AN ETHYLENICALLY UNSATURATED DICARBOXYLIC ACID IMIDE AND A CROSS-LINKING AGENT
Cyrille Van Eygen and Arthur Weerens, Watermael-Boitsfort, Belgium, assignors to UCB (Union Chimique-Chemische Bedrijven) S.A.
No Drawing. Filed Feb. 2, 1966, Ser. No. 524,485
Claims priority, application Great Britain, Feb. 4, 1965, 4,899/65
U.S. Cl. 260—836          11 Claims
Int. Cl. C08f 19/00, 33/08

ABSTRACT OF THE DISCLOSURE

The thermosetting compositions consisting of (I) a copolymer A of at least one ethylenically unsaturated compound (for example, an ester of (meth)acrylic acid) with an ethylenically unsaturated substance containing an imide group which is unsubstituted at the nitrogen atom (for example, maleimide), and (II) at least one cross-linking agent B selected from among (a) a compound containing at least two epoxide groups (for example, an epoxy resin);
(b) a compound containing an epoxide group and an ethylenic double bond (for example, glycidyl methacrylate) or a copolymer of such compound with an ethylenically unsaturated compound;
(c) divinylsulfone or precursors of this compound;
(d) a compound containing two aldehyde groups (e.g. glyoxal), and
(e) a compound containing at least two N-alkoxymethyl groups (e.g. hexabutoxymethylmelamine)

are excellently suited for use in the field of paints, varnishes, enamels, textile dressing, and coatings of all kinds which have to withstand chemical agents and heat.

The present invention is concerned with new thermosetting resinous compositions, with a method of preparing the same, with coatings obtained with such compositions and also with articles covered with said coatings.

It is known to prepare resinous compositions by the copolymreization of unsaturated monomers carrying a carboximide function with olefinic derivatives, such as vinyl chloride, acrylonitrile, styrene, acrylic esters, vinyl esters and the like.

It is also known to provide a reactive grouping in the aforesaid copolymers by replacing the hydrogen atom of the carboximide function, with the object of cross-linking the resulting resinous compositions, one example being the copolymerization of N-methylol-maleimide with styrene or vinyl acetate.

The imide function is, however, capable of reacting with various other functions. Thus, it is known that the epoxide function can react with the imide function: Petrov and Stephenson (J. Pharm. and Pharmacol. 5 (1953), 359) prepared a series of N-(3-aryloxy-2-hydroxypropyl)-succinimides by the reaction of phenyl-substituted glycidic ethers with succinimide; on the other hand, Terada (Nippon Kagaku Zasshi, 77 (1936), 1265) obtained 1-hydroxy-2-sucinimido-ethyl-benzene by reacting styrene oxide with succinimide.

It has also been established that the imide function can enter into an addition reaction on a double bond activated in a suitable manner. Thus, succinimide adds to acrolein to give 3-(N-succinimyl)-propionaldehyde (Moc and Warner, J. Am. Chem. Soc. 71 (1954), 1251); succinimide also adds to methyl vinyl ketone (Arai and Schrina, Kogyo Kagaku Zasshi, 62 (1959), 82); further succinimide forms addition compounds with vinylic ethers (Furakawa, Oniskitsuruta, J. Org. Chem. 23 (1958), 672) and it has been shown that one molecule of divinyl sulfone can add to two molecules of succinimide to form bis-[2-(N-succinimyl)-ethyl]-sulfone.

It is also known that formaldehyde reacts with the imide grouping under certain conditions to form compounds of the N,N'-methylene-bis-imide type. This is true of the addition of formaldehyde to succinimide, as has been shown by Bechert (J. Prakt. Chem./2/50 (1894), 1) and Breslauer and Pictet (Berichte, 38 (1907), 3784).

Our copending application Ser. No. 455,950, filed May 14, 1965, is concerned with the cross-linking of imido copolymers with hexamethylenetetramine and its addition compounds to give new products.

As far as is known, however, no use has so far been made of the reactivity of the imide group towards the epoxide group, the aldehyde group and the sufficiently activated carbon-carbon double bond to obtain thermosetting resinous polymers. For this reason, an object of the present invention is a method of preparing thermosetting resinous compositions, wherein a copolymer A is prepared from at least one unsaturated olefinic compound and an ethylenically unsaturated compound containing an imide group which is not substituted on the nitrogen, the copolymer A thus obtained is hardened by heating with at least one cross-linking agent B selected from the group consisting of a compound containing at least two epoxide groups, a compound containing an epoxide group and an ethylenically unsaturated double bond, divinyl sulfone, its release compounds, a compound containing two aldehyde groups and a compound containing at least two N-alkoxymethyl groups.

This new process offers an important and unexpected advantage. It enables indeed the cross-linking of the resinous composition used according to the present invention to be carried out rapidly and at a moderate temperature. Transparent, colorless masses or films are thus obtained which have an exceptionally great resistance to water, dilute alkalis and solvents.

By an ethylenically unsaturated compound, there is to be understood any compound containing in its molecule one or more polymerizable double bonds, for example, aliphatic ethylenically unsaturated compounds, such as ethylene, propylene, isobutylene, butadiene, isoprene, 2,3-dimethyl-butadiene, 2-chloro-butadiene, 2,3-dichlorobutadiene, 2-bromobutadiene, 2-fluorobutadiene and 2,3-difluorobutadiene; ethylene derivatives, such as styrene, vinyl-toluene, divinyl-benzene, alpha-chlorostyrene, vinyl-naphthalene, vinyl-pyridine, vinyl-carbazole and the like; acrylic and methacrylic acids and the esters, amides and nitriles of these acids, for example, acrylamide, methacrylamide, methyl, ethyl and butyl acrylate and methacrylate and the like; acrylonitrile, methacrylonitrile, acrolein and the like; vinyl compounds, such as vinyl formate, acetate, propionate and butyrate, vinyl and vinylidene chloride, bromide and fluoride, vinyl methyl ether, vinyl ethyl ether, vinyl methyl ketone, vinyl ethyl ketone, vinyl isobutyl ketone, divinyl ketone; vinyl alkyl sulfones, such as vinyl ethyl sulfone, vinyl thioethers and the like.

The resinous compositions of the present invention contain at least one of the olefinic compounds of which some examples have been given above.

The following are mentioned as examples of the ethylenically unsaturated compounds containing an imide group which is not substituted on the nitrogen: maleimide, itaconimide, citraconimide, glutaconimide, the halomaleimides, the -alkyl- and -alkoxy-maleimides, the C-vinyland -allyl-succinimides, C-vinyl- and -allyl-glutarimides, vinyl- and allyl-tetrahydrophthalimide and the like.

The following examples are given of cross-linking agents carrying at least two epoxide groups: diglycidyl ether, 1,2-epoxy-3,4-epoxybutane, hexadiene dioxide, limonene dioxide, stoichiometric condensation products of two or more mols of epichlorohydrin with monoamines, such as alkylamines (for example, N,N-di-(2,3-epoxypropyl)-n-butylamine, with aliphatic polyols, such as ethylene glycol, hexane-1,6-diol, glycerol, tris-(hydroxymethyl)-propane, mannitol, sorbitol, erythritol and polyvinyl alcohol, or with aromatic polyols, such as hydroquinone, resorcinol, pyrocatechol, Bisphenol-A, di- and polyhydroxy-naphthalenes and anthracenes, p,p-dihydroxydiphenyl, p,p'-dihydroxy-dibenzyl, 2,2' - dihydroxy - 1,1'-dinaphthyl-methane, p,p'-dihydroxy-benzophenone, p,p'-dihydroxyphenyl sulfone, esters of dicarboxylic acids with glycidol, for example, diglycidyl adipate, diglycidyl sebacate and the like. The resinous products obtained by the condensation of epichlorohydrin with diols or polyols, of which some examples are given above, can also be used but in a nonstoichiometric ratio, for example, in the epichlorohydrin to polyol molar ratio of 1:1. These compounds are known commercially under the name of epoxy resins, "Epikote" and "Epon" resins (Shell Development Co.), "Araldit" (CIBA A.G.), "Coil Seal" (National Engineering Products, Inc.), and the like. In certain of these resins, the free hydroxyl groups of the polymer chain are esterified with unsaturated fatty acids. In addition, these resins may be mixed with other resins (phenol-aldehyde, urea-aldehyde, melamine-aldehyde, polyester and silicone-alkyd resins) and also with hardeners (polybasic acids, amines, polyamines and amides) and the like.

As cross-linking agent carrying an epoxy group and an ethylenically unsaturated double bond, mention is, in particular, made of esters of unsaturated acids with glycidol, for example, glycidyl acrylate and methacrylate, glycidyl crotonate, diglycidyl maleate, glycidyl vinyl carbamate and the like. In addition, a copolymer may be prepared from those compounds containing, at the same time, an epoxy group and an ethylenically unsaturated double bond with other copolymerizable ethylenically unsaturated compounds, such as styrene, vinyl acetate, methyl methacrylate and the like.

Divinyl sulfone also possesses the property of acting as a cross-linking agent in the process of the present invention. We have found that this compound occupies an outstanding position in relation to the divinyl compounds in general, for example, divinyl-benzene, divinyl-toluene, diallyl phthalate and the like. It may, consequently, be assumed that the sulfone group in divinyl sulfone suitably activates the vinyl groups so as to enable the latter, in this way, to react with the imide groups present in the copolymers A. Instead of using divinyl sulfone directly, its release compounds, such as bis-(2-hydroxyethyl)-sulfone, bis-(2-pyridinium - methyl) - sulfone chloride, the Bunte salt of divinyl sulfone and the like may successfully be used.

As cross-linking agent containing two aldehyde groups, mention is made, in the aliphatic glyoxal series, of malonic, succinic, glutaric, adipic, pimelic and sebacic dialdehydes, 1,4-butene-dial and glutaconic-dialdehyde, and, in the aromatic series, of o-phthalaldehyde, terephthalaldehyde and the like.

As cross-linking agent containing at least two N-alkoxymethyl groups, mention is made of di-, tetra-, or hexamethoxymethylmelamine, di-, tetra- or hexabutoxymethylmelamine, and the like.

In the resinous compositions of the present invention, the unsaturated olefinic compound or compounds represents or represent 60 to 99.5% by weight, preferably 85 to 99% by weight, of the total polymerizable unsaturated compounds, while the unsaturated carboximide represents 0.5 to 40% by weight, preferably 1 to 15% by weight, of these same compounds.

The quantity of cross-linking agent added to the resinous compounds of the present invention varies from 0.25 to 20% by weight, preferably from 1 to 10% by weight, referred to the total unsaturated polymerizable compounds. However, when the cross-linking agent is used in the form of a copolymer (see Example 2 hereinafter), for the purpose of calculation, only the quantity of cross-linking agent introduced into the chain (and not that of the entire copolymer) is taken into account.

The copolymerization of the olefinic compound or compounds with the unsaturated carboximide which is not substituted on the nitrogen, may be effected in conventional manner, either in solution, using an organic solvent, or in an aqueous suspension or emulsion.

For the purpose of copolymerization in solution, use is made of the catalysts normally used in solution polymerization, for example, benxoyl peroxide or azo-bis-isobutyronitrile. The solvent used as the medium for solution copolymerization is selected from those which dissolve, at the same time, the olefinic monomer or monomers, the unsaturated carboximide, the copolymer formed and also the cross-linking agent. A solvent of this type is selected from the class consisting of polar solvents and is preferably an alcohol, a ketone, a chlorinated aliphatic hydrocarbon, an aliphatic ester, an aromatic hydrocarbon, or the like. In certain cases, it may be necessary to use a mixture of solvents in order to keep all the components of the mixture in solution. Solution copolymerization is effected in conventional manner by heating the mixture of monomers in the presence of the polymerization catalyst, which is added in one or more stages. A convenient method of operating consists in effecting the copolymerization at the boiling temperature of the solvent. The duration of the copolymerization depends on the polymerization temperature and the reactivity of the monomers used. The copolymer solution may be used as it is for the cross-linking or else a part of the solvent may be eliminated in order to obtain a more concentrated solution, which may, for example, contain up to 60% by weight of copolymer. It is even possible to replace part of the solvent used for the copolymerization by other solvents, with the object of improving the quality of the film deposited by the solution.

For emulsion copolymerization, use is made of water-soluble polymerization catalysts, for example, hydrogen peroxide, potassium or ammonium persulfate, a redox system, or the like. The copolymerization is effected in conventional manner by agitating the aqueous medium containing the monomers and the catalyst in the presence of one or more emulsifiers, such as alkyl aryl sulfonates, non-ionic oxyethylation products of alcohols, alkyl-phenols, acids or amines containing a hydrocarbon chain having at least 8 carbon atoms (for example, polyoxyethylated nonyl-phenol sulfate, polyoxyethylated oleocetyl alcohol), and the like, and by maintaining the aqueous emulsion at a temperature between room temperature and the boiling point of the emulsion. Here again, the duration of the copolymerization depends on the polymerization temperature and the reactivity of the monomers used.

The aqueous copolymer emulsion thus obtained may be used as it is for the purpose of cross-linking or else it may be concentrated by eliminating part of the water. In general, the emulsions contain up to 60% by weight of copolymer.

In order that the resinous compositions of the present invention may be ready for use, the cross-linking agent B is added at room temperature to the above-described solutions or emulsions of copolymers A and completely dissolved, while agitating. Where applicable, a cross-linking catalyst is added thereto, such as a tertiary amine (e.g. triethylamine, pyridine, or the like) a quaternary ammonium hydroxide (tetrabutyl-ammonium hydroxide, n-hexadecyltriethylammonium hydroxide, benzyltrimethylammonium hydroxide, and the like), a strong organic acid (trichloroacetic acid or its ammonium salt), as well as fillers, pigments, plasticizers and other conventional additives, which are uniformly distributed throughout the mass. The resinous composition is applied to the substrate to be covered, the solvent or water evaporated and the film is cured at a temperature of 70 to 170° C., preferably of 90 to 150° C., for a time varying from 2 to 60 minutes, depending on the monomers used and the temperature used during the cross-linking. In general, the longer the time and the higher the cross-linking temperature, the more insoluble the deposited film will become.

It will be noted that it is possible to effect the hardening of the resinous composition outside the range from 70 to 170° C. Nevertheless, at temperatures below 70° C., the hardening time is too long from the practical point of view, while at temperatures above 170° C., the risk of coloration of the coating film increases as the temperature rises.

The films obtained from the resinous compositions according to the present invention are distinguished by their transparency. Hardness and flexibility vary with the nature of the monomers used. Thus, hardness is particularly great in the case of films prepared from resinous compositions according to the present invention containing a high proportion of methyl methacrylate. Resistance to the action of water, of dilute alkalis and of normal organic solvents is exceptionally high; certain films perfectly withstand boiling for several tens of hours with very aggressive solvents, such as acetone and dimethylformamide.

The resinous compositions of the present invention are, therefore, excellently suited for numerous applications in the field of paints, varnishes, enamels, textile dressings and coatings of all kinds which have to withstand chemical agents and heat.

The following examples are given for the purpose of illustrating the present invention, the parts and the percentages being by weight, unless otherwise indicated. In these examples, the coating obtained by the resinous compositions are examined as to their solubility in various solvents by heating them at 65° C. for 30 minutes; and as to their swelling by leaving them immersed in the solvents at room temperature for 50 hours. Other tests will be described where used. These examples are not intended to limit the scope of the present invention.

Example 1

A mixture of 500 parts of acetone and 16 parts of maleimide is rapidly brought to boiling point, under reflux, in an atmosphere which has been purged with a current of nitrogen, after which 1 part of azo-bis-isobutyronitrile is added. Then, after 3 hours, 200 parts of methyl methacrylate are added, little by little, while stirring.

After stirring for 10 hours and heating to boiling temperature, under reflux, another 1 part of azo-bis-isobutyronitrile is added and the operation continued for a further 10 hours. The reaction mixture is then allowed to cool, a viscous solution of the desired copolymer being obtained.

11 parts of a bis-epoxide resin of low molecular weight obtained by the reaction of epichlorhydrin with Bisphenol-A having an epoxide equivalent of 175–210 and 0.4 part of triethylamine are then added to the cooled solution. The resulting solution, which is ready for use, contains 7.04% maleimide. The viscous solution is poured onto polytetrafluorethylene boards and the solvent is allowed to evaporate at room temperature. Films are obtained which are easily detached and which are still completely soluble in ordinary solvents.

However, if these films are subjected to an elevated temperature, they become insoluble, as is shown in the following Table I, the heating times being, in all cases, 15 minutes:

Table I

| Heating temperature, °C.: | Solubility in acetone, percent |
|---|---|
| 70 | 9 |
| 90 | 5 |
| 110 | 1 |
| 130 | 0 |
| 150 | 0 |

Table II shows that by increasing the temperature to 150° C. and the heating time to 30 minutes, excellent results are still obtained by substantially decreasing the content of maleimide:

TABLE II

| Maleimide (in percent) | Solubility in acetone (in percent) | Swelling in acetone (in percent) |
|---|---|---|
| 1.75 | 8 | 220 |
| 2.50 | 7 | 150 |
| 3.75 | 0 | 50 |

Example 2

The same copolymer of methyl methacrylate and maleimide is prepared as in Example 1 (solution A) but instead of the bis-epoxide resin, 1 part of a solution (solution B) prepared in the following manner is added per part of this copolymer.

600 parts of acetone, 225 parts of methyl methacrylate, 15 parts of glycidyl methacrylate and 1 part of azobisisobutyronitrile are heated under reflux for 10 hours and then 1 part more of the initiator is added. Heating under reflux is then maintained for 10 hours and the solution is thereafter allowed to cool.

1 part of triethylamine is added to 100 parts of the mixture composed of equal parts of solution A and solution B and the resulting solution is poured onto polytetrafluorethylene boards.

After drying at room temperature, the films are soluble in acetone. However, if these films are heated to 150° C., they become remarkably insoluble, as is shown in Table III:

Table III

| Duration of heating, min.: | Solubility in acetone, percent |
|---|---|
| 5 | 2 |
| 10 | 1 |
| 15 | 0 |
| 30 | 0 |

We have found that this insolubility is due to a reaction between the maleimide and the glycidyl methacrylate components. Indeed:

(a) By heating the solution B alone, some self-crosslinking does take place but insolubilization is considerably less than that described above. Thus, when a film is formed with solution B and is cured at 150° C. for 10 minutes, solubility in acetone is still 15%.

(b) By omitting the maleimide in the mixture of solutions A and B, only partial cross-linking is obtained and the methyl polymethacrylate can still be extracted. There is, therefore, no encagement effect of a soluble polymer by a cross-linked polymer. Thus, when methyl methacrylate and a methyl methacrylate-glycidyl methacrylate copolymer are mixed in a ratio of 1:2 and a film prepared from this mixture is subjected to curing for 15 minutes at 150° C., a solubility in acetone of 39% is noticed. Consequently, all the methyl methacrylate is dissolved, as well as a little copolymer.

This shows that the results obtained above are certainly specific for the mixture of a copolymer containing maleimide and a copolymer containing epoxy groups.

Example 9

A methyl methacrylate-maleimide copolymer is prepared as in Example 1 and 1 part of divinyl sulfone and 1 part of triethylamine are added thereto per 100 parts of the cold solution of this copolymer. Films are prepared in the manner described above and the following results are obtained by heating for 15 minutes at the indicated temperature:

TABLE IV

| Heating temperature (in °C.) | Solubility in acetone (in percent) | Swelling in acetone (in percent) |
| --- | --- | --- |
| 50 | 32 | 960 |
| 70 | 16 | 520 |
| 90 | 6 | 470 |
| 110 | 5 | 190 |
| 150 | 2 | 150 |

By varying the maleimide content, the following results are obtained for a heating time of 30 minutes at 150° C.:

TABLE V

| Maleimide (in percent) | Solubility in acetone (in percent) | Swelling in acetone (in percent) |
| --- | --- | --- |
| 1.75 | 4 | 200 |
| 2.50 | 3 | 160 |
| 3.50 | 1 | 100 |
| 5.60 | 0 | 100 |

Example 4

300 parts of butanol, 300 parts of xylene, 200 parts of butyl methacrylate, 85 parts of styrene, 85 parts of methyl methacrylate and 30 parts of maleimide are brought to boiling point in an atmosphere which has been purged with a current of nitrogen, after which 1 part of benzoyl peroxide is added. After heating for 5 hours under reflux, 1 part of benzoyl peroxide is again added and heating under reflux is continued for a further 5 hours.

The mixture is cooled and is, at this moment, in the form of a slightly yellow viscous solution. 20 parts of bisepoxide resin (same as resin employed in Example 1) and 0.5 part of triethylamine are added thereto. The solution is then ready for use.

The films prepared on boards of polytetrafluorethylene, as in Example 1, are soluble in boiling acetone at 65° C., whereas, after heating for 30 minutes at 150° C., their solubility is only 3% and their swelling is only 180%.

Example 5

7 parts of N,N-di(2,3-epoxy-propyl)-n-butylamine are added, as a cross-linking agent, to 100 parts of a resin prepared as in Example 4. The thus obtained mixture is used to prepare films that are cured for 30 minutes at 125 or 150° C. Table VI shows the resistance of these films to acetone:

TABLE VI

| Heating temperature (in °C.) | Solubility in acetone (in percent) | Swelling in acetone (in percent) |
| --- | --- | --- |
| 125 | 7 | 110 |
| 150 | 3 | 90 |

Example 6

The resin prepared as in Example 4 may also be cross-linked by mixing it with hexabutoxymethylmelamine and trichloroacetic acid in the following proportions: 100:17:3 and by heating the obtained films for 30 minutes at 130° C. or 150° C. The cross-linked enamel prepared from this mixture has a good resistance to acetone, as shown by Table VII:

TABLE VII

| Heating temperature (in °C.) | Solubility in acetone (in percent) | Swelling in acetone (in percent) |
| --- | --- | --- |
| 130 | 2 | 35 |
| 150 | 0 | 20 |

If the same enamel is immersed for 48 hours in water at 70° C., no apparent alteration is noticed.

Example 7

A mixture of 500 parts of butyl acetate, 170 parts of butyl methacrylate, 10 parts of methyl methacrylate, 70 parts of styrene, 35 parts of maleimide and 0.4 part of benzoyl peroxide is brought to boiling point under reflux. One hour after beginning the reflux, 15 more parts of maleimide and 0.4 part of benzoyl peroxide, both dissolved in 60 parts of butyl acetate, are added to the boiling mixture. Two hours after beginning the reflux, another addition is made of 10 parts of maleimide and 0.4 part of benzoyl peroxide dissolved in 50 parts of butyl acetate. Heating is continued for a total duration of 8 hours. The reaction mixture is then allowed to cool and a viscous solution is obtained containing 40% of the desired copolymer.

55 parts of diglycidyl resorcinate and 60 parts of a 5% butanol solution of benzyltrimethylammonium hydroxide are then added, while stirring, to the cold solution. The resulting solution is used to pour films on adequate supports (glass, polytetrafluorethylene, metal) and the solvent is left to evaporate at room temperature. These films are still easily soluble in ordinary solvents.

However, if these films are subjected to a heat curing for 30 minutes at the temperatures indicated in Table VIII hereinafter, they acquire an almost complete insolubility:

TABLE VIII

| Heating temperature (in °C.) | Solubility in acetone (in percent) | Swelling in acetone (in percent) |
| --- | --- | --- |
| 100 | 3 | 22 |
| 125 | 1.5 | 18 |
| 150 | 0.5 | 17 |

On the other hand, if the aforesaid resin is used to prepare a white enamel by mixing it as follows:

| | Parts |
| --- | --- |
| Resin | 150 |
| Titanium oxide | 350 |
| Methyl isobutyl ketone | 80 | and if the films obtained from this mixture are submitted to a heat curing for 30 minutes at the temperatures indicated in Table IX, the resulting cross-linked enamels become very resistant to solvents as shown hereafter:

TABLE IX

| Solvent | Heating temperature (in °C.) | Total solubility (in percent) | Swelling (in percent) |
| --- | --- | --- | --- |
| Acetone | 100 | 3 | 18 |
|  | 125 | 1.5 | 12 |
| Dimethylformamide | 100 | 3 | 40 |
|  | 125 | 2.5 | 30 |
| 2-ethoxyethyl acetate | 100 | 2.5 | 30 |
|  | 125 | 1 | 25 |

The same cross-linked enamel shows no noticeable defect after having been submerged for 53 hours at room temperature in a 1% sodium hydroxide solution.

Example 8

The same resin as in Example 7 is prepared but using tetrabutylammonium hydroxide as the cross-linking catalyst in the same aforesaid proportions. From the obtained mixture, an enamel is prepared as described in Example 7 and this enamel is heated for 30 minutes at different temperatures. Table X shows the resistance of the resulting films to acetone:

TABLE X

| Heating temperature (in °C.) | Solubility in acetone (in percent) | Swelling in acetone (in percent) |
| --- | --- | --- |
| 100 | 3 | 21 |
| 125 | 1.5 | 17 |
| 150 | 0.75 | 17 |

Example 9

The same resin as in Example 7 is prepared but using, as the cross-linking agent, divinylsulfone in the following proportions: 96.5 parts of resin, 3 parts of divinylsulfone and 0.5 part of benzyltrimethylammonium hydroxide. An enamel is then prepared as described in Example 7 and films are poured. These are heated for 30 minutes at various temperatures. Table XI shows the resistance of these films to acetone:

TABLE XI

| Heating temperature (in ° C.) | Solubility in acetone (in percent) | Swelling in acetone (in percent) |
|---|---|---|
| 100 | 3.5 | 37 |
| 125 | 1.5 | 23 |
| 150 | 1 | 23 |

Example 10

A mixture of 350 parts of distilled water, 3 parts of polyoxyethylated nonyl-phenol sulfate and 9 parts of polyoxyethylated oleocetyl alcohol is heated to 75° C., 0.3 part of ammonium persulfate is added and then, while allowing the temperature to rise to a maximum of 85° C., a mixture of 130 parts of ethyl acrylate, 130 parts of methyl methacrylate and 12 parts of maleimide is added over a period of 45 minutes. The reaction mixture is kept at 85° C. for 45 minutes after the end of the addition and is then allowed to cool. A latex containing 42.5% of the desired copolymer is thus obtained.

2 parts of a 40% aqueous solution of glyoxal are added to 100 parts of this latex. Then, as described in Example 1, films are prepared from this emulsion and dried. The dried films are soluble in acetone.

However, if these films are heated for 30 minutes at 150° C., they become practically insoluble in boiling acetone and their swelling in acetone reaches a value of 300%.

We claim:

1. A thermosetting resinous composition consisting essentially of (1) a copolymer of 60 to 99.5% by weight of at least one ethylenically unsaturated compound and 0.5 to 40% by weight of an aliphatic ethylenically unsaturated dicarboxylic acid imide, which is not substituted on the nitrogen atom, said ethylenically unsaturated compound being different from said dicarboxylic acid imide, and (II) 0.25 to 20% by weight, based on the amount of copolymer (I), of at least one cross-linking agent selected from the group consisting of a compound containing at least two epoxide groups, an ethylenically unsaturated compound containing an epoxide group, divinyl sulfone, a compound containing two aldehyde groups and a compound containing at least two N-alkoxymethyl groups.

2. Thermosetting resinous composition as claimed in claim 1, in which the copolymer (I) contains 85 to 99% by weight of ethylenically unsaturated compound and 1 to 15% by weight of aliphatic ethylenically unsaturated N-unsubstituted dicarboxylic acid imide.

3. Thermosetting resinous composition as claimed in claim 1, in which the amount of cross-linking agent (II) represents 1 to 10% by weight of copolymer (I).

4. Thermosetting resinous composition as claimed in claim 1, in which the cross-linking agent (II) is an ethylenically unsaturated compound containing an epoxide group, said ethylenically unsaturated compound containing an epoxide group, being in the form of a copolymer with another ethylenically unsaturated monomer.

5. A process of preparing thermosetting resinous compositions, which comprises copolymerizing 60 to 99.5 parts by weight of at least one ethylenically unsaturated monomer with 0.5 to 40 parts by weight of an aliphatic ethylenically unsaturated dicarboxylic acid imide, which is not substituted on the nitrogen atom, said ethylenically unsaturated compound being different from said dicarboxylic acid imide, and mixing the resulting copolymer with 0.25 to 20% by weight of a cross-linking agent selected from the group consisting of a compound containing at least two epoxide groups, an ethylenically unsaturated compound containing an epoxide group, divinyl sulfone, a compound containing two aldehyde groups and a compound containing at least two N-alkoxymethyl groups.

6. A process as claimed in claim 5, in which a cross-linking catalyst selected from the group consisting of a tertiary amine, a quaternary ammonium hydroxide and a strong organic acid, is added to the cross-linking agent.

7. A process as claimed in claim 5, in which after addition of the cross-linking agent, the resin is heated at a temperature of from 70 to 170° C.

8. A process as claimed in claim 5, in which after addition of the cross-linking agent, the resin is heated at a temperature of from 90 to 150° C.

9. A coating composition consisting essentially of a thermosetting resinous composition as defined in claim 1 and solvent therefor.

10. Film consisting essentially of a thermoset resinous composition as defined in claim 1.

11. An article of manufacture consisting of a substrate and a coating thereon, said coating consisting essentially of a thermoset resinous composition as defined in claim 1.

References Cited

UNITED STATES PATENTS 3,222,418  11/1965  Murdock _____ 260—836

SAMUEL H. BLECH, *Primary Examiner.*

PAUL LIEBERMAN, *Assistant Examiner.*

U.S. Cl. X.R.

117—161; 260—2, 29.6, 31.2, 32.8, 33.4, 33.6, 41, 47, 78, 827, 837, 844, 851, 856, 873